(12) United States Patent
Agarwal

(10) Patent No.: US 10,192,179 B1
(45) Date of Patent: Jan. 29, 2019

(54) SESSION TRANSFER IN A CUSTOMER SERVICE ENVIRONMENT

(71) Applicant: Amazon Technologies, Inc., Reno, NV (US)

(72) Inventor: Saket Agarwal, Andhra Pradesh (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 840 days.

(21) Appl. No.: 14/265,758

(22) Filed: Apr. 30, 2014

(51) Int. Cl.
 *G06Q 10/06* (2012.01)
 *G06Q 30/00* (2012.01)

(52) U.S. Cl.
 CPC ... *G06Q 10/063114* (2013.01); *G06Q 30/016* (2013.01); *H04M 2203/404* (2013.01)

(58) Field of Classification Search
 None
 See application file for complete search history.

(56) References Cited

U.S. PATENT DOCUMENTS

| | | | | |
|---|---|---|---|---|
| 5,937,051 A * | 8/1999 | Hurd | ............... | H04M 3/5183 379/212.01 |
| 7,003,550 B1 * | 2/2006 | Cleasby | ............ | G06F 17/30873 707/E17.111 |
| 7,840,911 B2 * | 11/2010 | Milener | ............... | G06F 3/0482 715/822 |
| 9,798,753 B1 * | 10/2017 | Cook | ............... | G06F 17/30728 |
| 2004/0083213 A1 * | 4/2004 | Wu | ............... | G06F 17/3064 |
| 2005/0081188 A1 * | 4/2005 | Kumar | ............... | G06Q 30/02 717/102 |
| 2008/0144804 A1 * | 6/2008 | Mergen | ............... | H04M 3/5166 379/266.1 |
| 2013/0173569 A1 * | 7/2013 | Pearcy | ............... | G06F 17/30 707/706 |
| 2014/0171034 A1 * | 6/2014 | Aleksin | ............... | G06Q 30/016 455/414.1 |

OTHER PUBLICATIONS

Enhancing Call Center Efficiency with Screen Pops; Televoice; 2005 (Year: 2005).*

* cited by examiner

*Primary Examiner* — Deirdre D Hatcher
(74) *Attorney, Agent, or Firm* — Thomas Horstemeyer, LLP

(57) ABSTRACT

Disclosed are various embodiments that relate to creation of a session corresponding to a support request initiated by a customer. Browsing activity, content pages and session notes of a customer service agent are tracked and stored, and a browse history user interface element expressing a browse history associated with the session is generated in a customer service agent user interface. If the session is transferred to another customer service agent, another customer service agent user interface can be generated that also includes the browse history user interface element.

20 Claims, 14 Drawing Sheets

SESSION TRANSFER IN A CUSTOMER SERVICE ENVIRONMENT

BACKGROUND

Users of an electronic commerce site or any other service may initiate contact with customer support to resolve issues or obtain information. Sites or companies with large customer bases may employ groups or teams of workers with specialized expertise who are tasked with handling a customer's issue if the issue falls within certain parameters. If a customer issue falls outside the worker's area of expertise, they can initiate a transfer of a session associated with the user's request for help to another worker.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
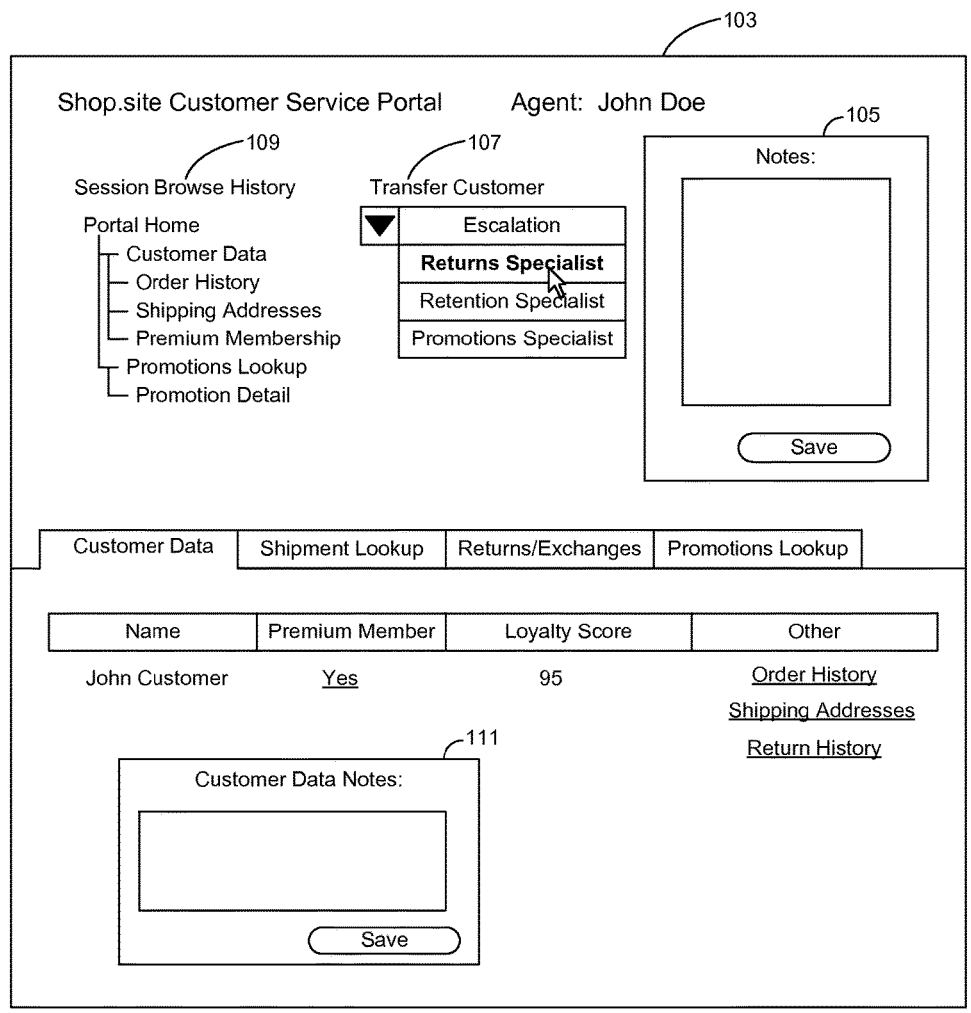
FIG. 1 is a drawing of an example scenario according to various embodiments of the disclosure.

The present disclosure relates to facilitating the providing of customer support to customers by customer service agents in a customer support environment in which customers may establish contact with customer service agents to resolve issues or seek information. In many environments, a company can employ hundreds or even thousands of customer service agents who are trained to resolve issues on behalf of customers making contact with a support team via phone, email, instant messaging, or any other form of communication. The company may also have in place customer relationship management (CRM) systems that facilitate interactions of customer service agents with customers. For example, these CRM systems can allow the agents to locate information about a customer, view their order history, and access other information with which the customer's issues can be handled or resolved.

In such an environment, a particular customer service agent may be trained with particular skills or be given certain parameters within which the agent must operate. Upon initiation of a customer support request, the customer service agent to which the customer is initially assigned may be unable to resolve the customer's issue or answer the customer's question. In such a scenario and in other possible scenarios, the customer service agent may transfer the customer to another customer service agent who may be better suited or have the authority to resolve the customer's issue.

For example, a support request initiated by a customer may be assigned to a particular customer service agent based upon a selection made by the customer via a contact form, a touchtone entry system (e.g., via a phone call), or by other mechanisms with which an initial assignment of a support request can be determined. Upon initiating contact with the customer, the initially assigned customer service agent may collect information about the customer via the CRM systems to determine the customer's identity, retrieve the customer's order history, or obtain any other information that might be relevant to the customer or the support request. Additionally, the customer may make a request of the customer service agent that the initially assigned customer service agent is not empowered to handle or is unable to handle for any reason. Accordingly, the customer service agent may escalate the customer's support request to a supervisor or higher authority that is empowered to handle such a request.

In such a scenario, the first customer service agent can initiate a request to transfer the support request to another customer service agent, who may initially lack the information collected by the first customer service agent, such as identifying information about the customer. Accordingly, requiring that the customer provide such information a second time to another customer service agent may result in a less than ideal customer service experience. Accordingly, embodiments of the disclosure can facilitate transferring contextual information about a customer and a support request initiated by the customer to a customer service agent to whom a support request is transferred to improve the customer service experience of the customer.

For example, such contextual information can include the pages to which a customer service agent has navigated during the course of attempting to handle a support request on behalf of a customer. In one embodiment, a user interface element, such as a hierarchical tree user interface element, can be provided that depicts a representation of a browse history associated with a particular support request. In other words, the user interface element can indicate which pages of a customer support portal to which one or more customer service agents have navigated. In some embodiments, the pages to which one or more customer service agents have navigated can also be cached for later retrieval by a customer service agent to which a particular support request has been transferred.

With reference to FIG. 1, shown is an example scenario 100 in which a user interface 103 is depicted that illustrates an example of a customer service agent user interface that can be generated by embodiments of the disclosure. The user interface 103 can be generated to facilitate interactions of a customer service agent with a customer when handling a support request. In one embodiment, the user interface 103 can include links to various content pages that can provide information about a particular customer associated with a support request as well as tools that can facilitate resolution of issues that might pertain to the support request. For example, the user interface 103 can display a customer's name, provide access to the customer's order history, shipping addresses and/or other profile information. The user interface 103 can also provide tools that allow a customer service agent to access more detailed information about shipments and/or orders of the customer, process returns or exchanges on behalf of the customer in an electronic commerce or retail scenario, and provide other tools that facilitate resolution of customer issues by a customer service agent.

The depicted user interface 103 also includes tools that facilitate the transfer of a support request from one customer service agent to another customer service agent. Accordingly, embodiments of the disclosure can create a session that is associated with a support request initiated by a customer that tracks various information pertaining to the customer service agent's handling of the support request. Accordingly, a notation user interface element 105 can be provided in the user interface 103 to allow a customer service agent to notate issues pertaining to the support request. The notes can be stored in a session in a data store that can be archived along with information about the support request and/or a customer account of the customer.

A transfer user interface element 107 can be provided to facilitate transfer of a support request to another customer service agent. Activating the transfer user interface element 107 can facilitate transfer of a chat session, an email thread, a voice call or any other communications established with the customer to another customer service agent. The user interface 103 also includes a browse history user interface element 109 that displays a hierarchical tree expressing the browse history of the customer service agent with respect to handling the support request of the customer. In other words, as the customer service agent navigates the various content pages and/or tools provided by the CRM system to resolve the customer's issue or answer the customer's question, the browse history user interface element 109 can display links to the content pages to which the customer service agent navigated during a session associated with the support request.

In this way, if the support request is transferred to another customer service agent via the transfer user interface element 107, the browse history user interface element 109 can provide context for the agent to which the support request is transferred in the way of showing the content pages accessed by the previous customer service agent who was handling the support request initiated by the customer.

Accordingly, embodiments of the disclosure can facilitate the creation of such a browse history user interface element 109 so that when a support request is transferred to another customer service agent, the customer service agent does not have to spend additional time deciphering the context and/or history of a support request. Additionally, embodiments of the disclosure can also cache the content pages accessed by the previous customer service agent that are shown in the browse history user interface element 109 to facilitate faster later retrieval of these content pages by the customer service agent to whom the support request is transferred.

The user interface 103 can also include one or more contextual notation user interface elements 111 that can be associated with particular tabs or particular areas of a customer service portal. A contextual notation user interface element 111 can allow a customer service agent to save notations that are specific to a particular user interface or content page of a customer service portal, which can be associated with a session corresponding to the support request and/or a profile of a user with which the support request is linked. Accordingly, the contextual notation user interface element 111 can be shown when a customer service agent accesses a particular content page or a particular tab of a content page within a customer service portal to provide contextual information about a customer and/or a support request.

Figure 2:
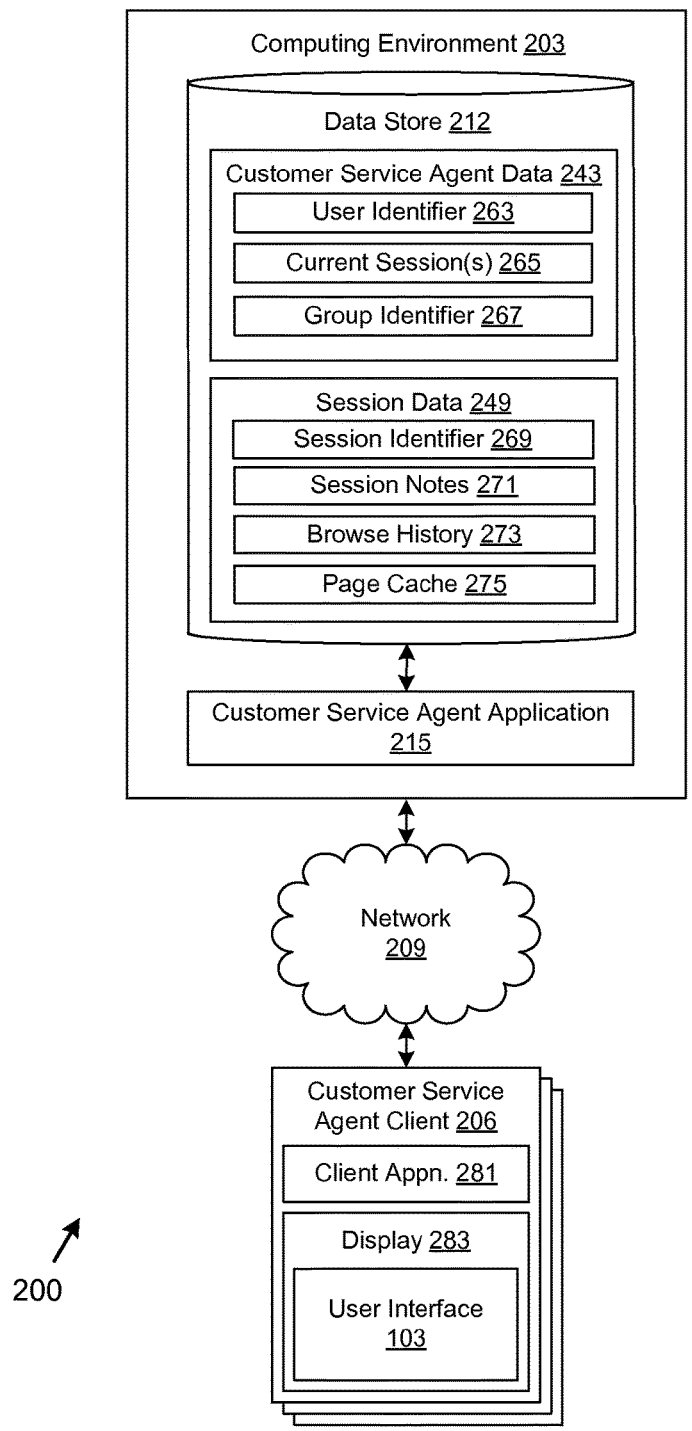
FIG. 2 is a drawing of a networked environment according to various embodiments of the present disclosure.

With reference to FIG. 2, shown is a networked environment 200 according to various embodiments. The networked environment 200 may include a computing environment 203 and one or more customer service agent clients 206 in data communication via a network 209. The network 209 may include, for example, the Internet, intranets, extranets, wide area networks (WANs), local area networks (LANs), wired networks, wireless networks, cellular networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data may be stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The applications executed on the computing environment 203, for example, include a customer service agent application 215, and other applications, services, processes, systems, engines, or functionality not discussed in detail herein. The customer service agent application 215 may be executed to facilitate the handling of support requests initiated by customers. The customer service agent application 215 can generate various user interfaces 103 with which a customer service agent can interact in order to handle requests or issues of customers as well as provide customers with information that might be related to the support request, such as customer information, order related information, etc.

The customer service agent application 215 may also perform various backend functions associated with handling customer support requests. For example, the customer service agent application 215 can facilitate a voice call between a customer and a customer service agent. The customer service agent application 215 can also facilitate an email discussion and/or chat session between a customer service agent and a customer. Additionally, the customer service agent application 215 can determine which customer service agent or team of customer service agents should be assigned a support request that is initiated by a customer. For example, if a customer enters information via an online support form about an issue that the customer would like to resolve, the customer service agent application 215 can identify a particular area of expertise that may be required to resolve the issue and select a customer service agent based on an expertise possessed by the agent and/or team of agents. To this end, the customer service agent application 215 may employ queues and/or other routing or waiting mechanisms to efficiently route customers to an appropriate customer service agent when the customer initiates a support request.

Accordingly, when a customer initiates a support request by calling a customer service help line, initiating contact via a web page form, a mobile application link or via any other mechanism, the customer service agent application 215 can generate a session that corresponds to the support request. As will be described herein, such a session can be employed to store various information about the support request as well as used to facilitate transfer of the support request from one customer service agent to another, should such a transfer become necessary.

The data stored in the data store 212 may include, for example, customer service agent data 243, session data 249, and potentially other data. The customer service agent data 243 may include various data associated with a customer service agent tasked with servicing support requests generated on behalf of customers. For example, the customer service agent data 243 can include a user identifier 263 that uniquely identifies a customer service agent with respect to other customer service agents. The customer service agent data 243 can also include information about current sessions 265 to which a particular customer service agent is assigned by the customer service agent application 215. In other words, when an agent is tasked with servicing a support request of a customer, an identifier or other information corresponding to the support request can be embodied in the current session 265 in the data store 212.

Customer service agent data 243 can also include a group identifier 267 which can identify a group or area of expertise associated with a particular customer service agent. For example, a customer service agent that is member of a team of agents tasked with handling product returns or exchanges on behalf of an electronic commerce site can be assigned a particular group identifier 267 so that the customer service agent application 215 can assign support requests to the customer service agent based on the area of expertise and an identified issue for which a support request is initiated by a customer.

Session data 249 can include information about sessions that are created in response to initiation of a support request by a customer. A session created by the customer service agent application 215 can store information about the activity of the customer service agent and the customer that pertain to the support request. For example, the session data 249 can include a session identifier 269 that uniquely identifies a particular session with respect to other sessions stored in the data store 212. The session data 249 can also include session notes 271, which can include notations taken by a customer service agent with respect to a support request. Session notes 271 can include contextual notations that can be created, saved and/or edited by a customer service agent via contextual notation user interface elements in the various user interfaces 103 that are linked with particular content pages and/or portions of content pages generated by the customer service agent application 215.

Session data 249 can further include browse history 273, which can include information about content pages accessed by a customer service agent during the course of servicing a support request of a customer. For example, the browse history 273 can include a reference to particular pages of a CRM system and/or workflow that are accessed by the customer service agent in response to receiving a support request, such as customer information, order information, and other content associated with servicing the support request. Entries in the browse history 273 can also be associated with a timestamp reflecting when a given content page was accessed and/or requested by the customer service agent. Additionally, session data 249 can further include a page cache 275 that caches content that is accessed by the customer service agent and that is associated with the browse history 273 of the session. For example, if a customer service agent accesses information about a particular customer, such as an order history, or information about a particular order, such as an order's details, these content pages can be cached in the page cache 275 for later retrieval by the same customer service agent and/or another customer service agent in the event that the session is transferred to another customer service agent.

The customer service agent client 206 is representative of a plurality of client devices that may be coupled to the network 209. The customer service agent client 206 may comprise, for example, a processor-based system such as a computer system. Such a computer system may be embodied in the form of a desktop computer, a laptop computer, a personal digital assistant, a cellular telephone, set-top box, music players, web pads, tablet computer systems, a gaming console, or other devices with like capability.

The customer service agent client 206 may be configured to execute a client application 281, such as a browser, a mobile app, a special purpose application configured to facilitate interactions with the customer service agent application 215 and/or other applications. The client application 281 may be executed in a customer service agent client 206, for example, to access and render network pages, such as web pages, or other network content served up by the computing environment 203 and/or other servers. The customer service agent client 206 may be configured to execute applications beyond the client application 281 such as, for example, email applications, instant message applications, and/or other applications. The customer service agent client 206 may include a display 283. The display 283 may comprise, for example, one or more devices such as liquid crystal display (LCD) displays, gas plasma-based flat panel displays, organic light emitting diode (OLED) displays, LCD projectors, or other types of display devices, etc. The client application 281 can render a user interface 103 upon the display 283 to facilitate interactions with a customer service agent.

Next, a general description of the operation of the various components of the networked environment 200 is provided. As noted above, the customer service agent application 215 can facilitate a customer service agent's handling of a support request initiated by a customer. In response to initiation of a support request, the customer service agent application 215 can generate a session that corresponds to the support request. Additionally, the customer service agent application 215 can also assign a particular customer service agent to the created session.

In some embodiments, the customer service agent application 215 can also initiate recording of a voice call or voice session between the customer service agent and customer. Additionally, the customer service agent application 215 can archive a transcript of text communications between the customer service agent and customer, such as in the case of a chat session that is initiated by the customer and/or an exchange of emails between the customer service agent and customer.

The customer service agent application 215 can generate one or more user interfaces 103 rendered by the customer service agent client 206 that facilitate the customer service agent's ability to resolve a support request and/or access information related to the support request. Additionally, the customer service agent application 215 can track the browse history 273 of a customer service agent to which the session is assigned with respect to the agent's handling of the support request. As noted above, as the customer service agent browses various content pages that are associated with the support request, such as content pages containing customer information, order information, support or help data, product information, or any other information that is requested by the customer service agent via the customer service agent client 206, a reference to the requested content pages is stored in the browse history 273. Additionally, the page cache 275 can be employed by the customer service agent application 215 to cache content from the requested content pages to facilitate later retrieval by the customer service agent and/or another agent to whom the session is transferred.

As will be shown in the subsequent drawings, the customer service agent application 215 can generate a browse history user interface element 109 that includes a hierarchical tree that expresses the browse history 273 associated with the session. In one embodiment, a root node of the hierarchical tree can represent an initial content page, such as an introductory page or a portal page to which the customer service agent is directed upon initiation of a support request on behalf of a customer. A first level of child nodes from the root nodes can represent links that the customer service agent follows from the portal page and/or other content pages that the customer service agent may access directly that do not correspond to links from the portal page. Further child nodes of the first level child nodes can then represent links followed from content pages that correspond to their respective parent nodes.

The browse history user interface element 109 can also be generated such that nodes are ordered in the order in which respective content pages associated with the nodes were accessed or requested by the customer service agent. For example, a first page accessed from the portal can be inserted as the first child node of the root node. A second page accessed from the portal can be inserted as the second child node of the root node, and so on. The various nodes within the browse history user interface element 109 can also be collapsible. The browse history user interface element 109 can also be configured such that nodes on the hierarchical tree comprise links to the content pages from the browse history 273 that the nodes represent. In this way, a customer service agent can navigate the browse history 273 and access respective content pages associated with the browse history 273 associated with the session by interacting with the browse history user interface element 109.

The customer service agent application 215 can facilitate transfer of a session from one customer service agent to another customer service agent. For example, in the event that a customer service agent to whom a particular session corresponding to a support request is assigned is unable to resolve a customer issue associated with the support request, the agent may initiate a request to transfer the session to another customer service agent and/or a group or department of customer service agents who may be better suited to resolve the customer's issue. In such a scenario, the customer service agent application 215 can generate a user interface 103 for the customer service agent to whom the session is transferred that also includes the browse history user interface element 109 as well as information such as session notes 271, an identity of the customer, and other session specific data. In this way, the session is transferred along with contextual information about the session to the other customer service agent. Additionally, because the page cache 275 can cache content pages accessed by the customer service agent from whom the session was transferred, the new customer service agent can access pages that have already been generated during the course of servicing the support request by the previous customer service agent, which may result in an improved customer experience.

Figure 3:
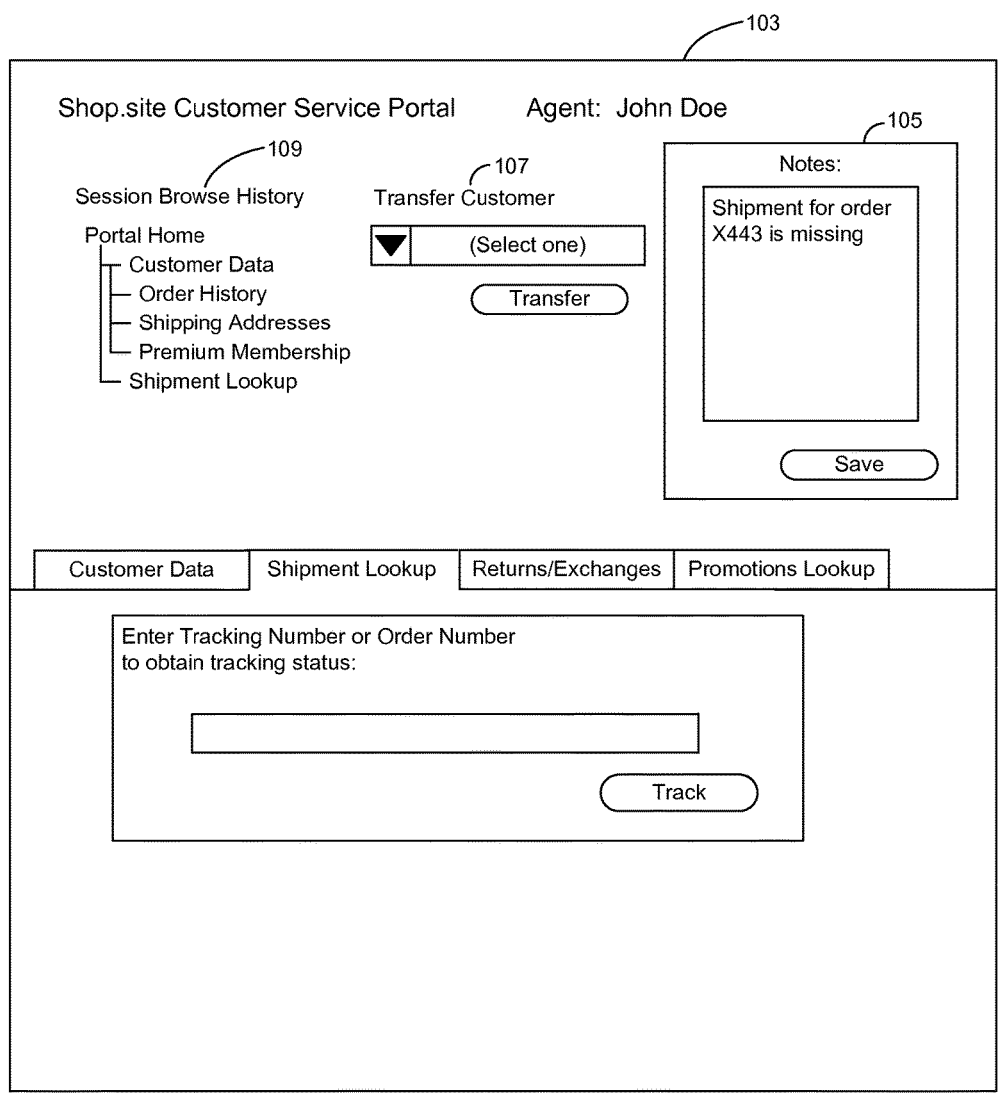
FIGS. 3-10 are drawings of example user interfaces rendered by a customer service agent client in the networked environment of FIG. 2 according to various embodiments of the present disclosure.

Referring next to FIG. 3, shown is a user interface 103 that can be generated by the customer service agent application 215 according to various embodiments of the disclosure. In the depicted user interface 103, which can also be referred to as a customer service agent user interface, various information that can facilitate a customer service agent's handling of a support request can be presented.

The example user interface 103 of FIG. 3 continues the example of FIG. 1. In the example of FIG. 3, the customer service agent, e.g., John Doe, has navigated to a different content page provided by the customer service agent application 215. Accordingly, as the customer service agent navigates to various content pages, the browse history user interface element 109 is updated by the customer service agent application 215. Additionally, the user interface 103 provides the ability for the customer service agent to notate the support request via the notation user interface element 105. The notations entered by the customer service agent can be stored in the data store 212 as session notes 271 by the customer service agent application 215. Accordingly, the session notes 271 can be made available to other customer service agents to whom the session may be assigned and/or transferred via the notation user interface element 105.

Figure 4:
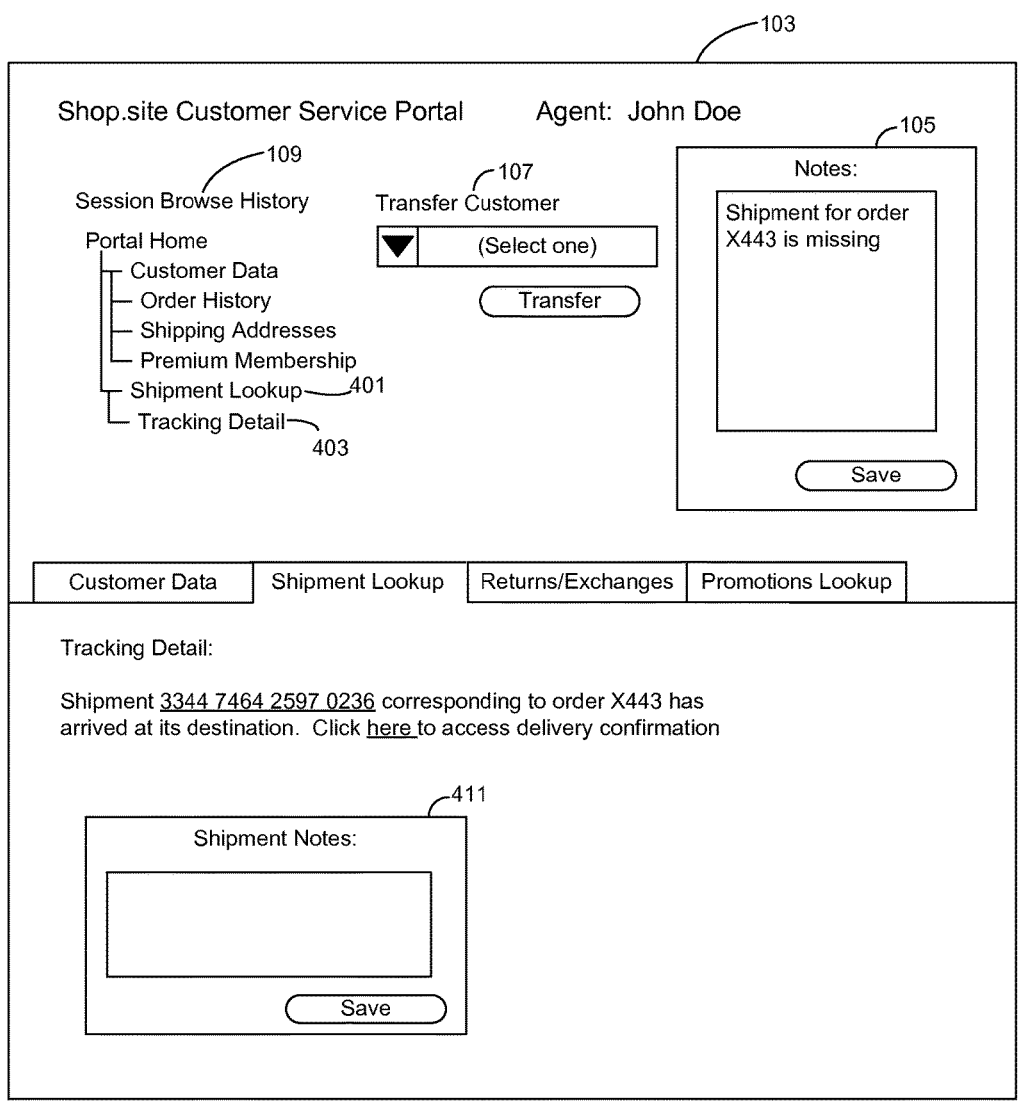

Continuing the example of FIG. 3, reference is now made to FIG. 4, which depicts a user interface 103 that can be generated by the customer service agent application 215 according to various embodiments of the disclosure. In the example user interface 103 of FIG. 4, the customer service agent to whom the support request corresponding to a session in the data store 212 is assigned has navigated to another content page provided by the customer service agent application 215. Accordingly, the browse history user interface element 109 is updated to reflect the navigation by adding additional nodes 401, 403 to the hierarchical tree represented by the browse history user interface element 109.

The content provided by the customer service agent application 215 in the depicted user interface 103 can also facilitate possible resolution of a customer issue associated with the support request. In the depicted example, the customer may be inquiring about an order that the customer has not received. Accordingly, the customer service agent can investigate a possible resolution to the issue as well as enter session notes 271 that can be stored in the data store 212 along with the session. FIG. 4 further illustrates a contextual notation user interface element 411 that allows a customer service agent handling a support request to save notations that can be context specific or specific to a particular content page and/or portion of the content page corresponding to the user interface 103 shown in FIG. 4. Accordingly, notations saved by the customer service agent can be stored with a session associated with a support request so that they can be accessible to one or more customer service agents to whom the support request may be transferred.

Figure 5:
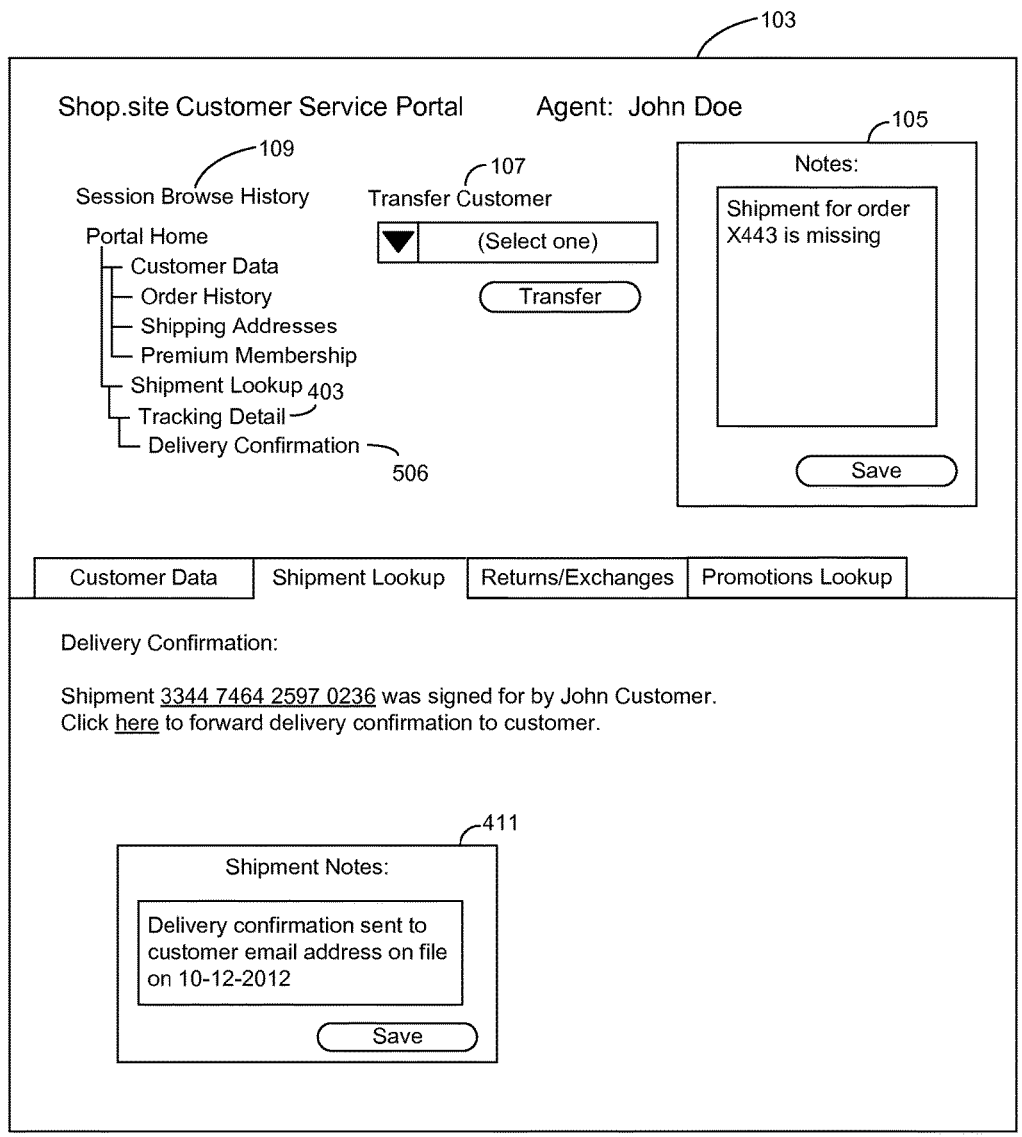

Continuing the example of FIG. 4, reference is now made to FIG. 5, which depicts a user interface 103 that can be generated by the customer service agent application 215 according to various embodiments of the disclosure. In the example user interface 103 of FIG. 5, the customer service agent to whom the support request corresponding to a session in the data store 212 is assigned has navigated to another content page provided by the customer service agent application 215.

In the example shown in FIG. 5, the content page accessed by the customer service agent was a link from the content page of FIG. 4. Accordingly, the browse history user interface element 109 is updated so that the node 506 is added to the browse history user interface element 109 as a child node of the nodes 401, 403 corresponding to the content page in FIG. 4 from which the customer service agent arrived at the content page shown in FIG. 5. Additionally, as shown in FIG. 5, notations taken by a customer service agent in the contextual notation user interface element 411 can be saved by the customer service agent application 215 in the data store 212 associated with the session so that they notations can be accessed by a subsequent customer service agent to whom a session associated with a support request is transferred.

Figure 6:
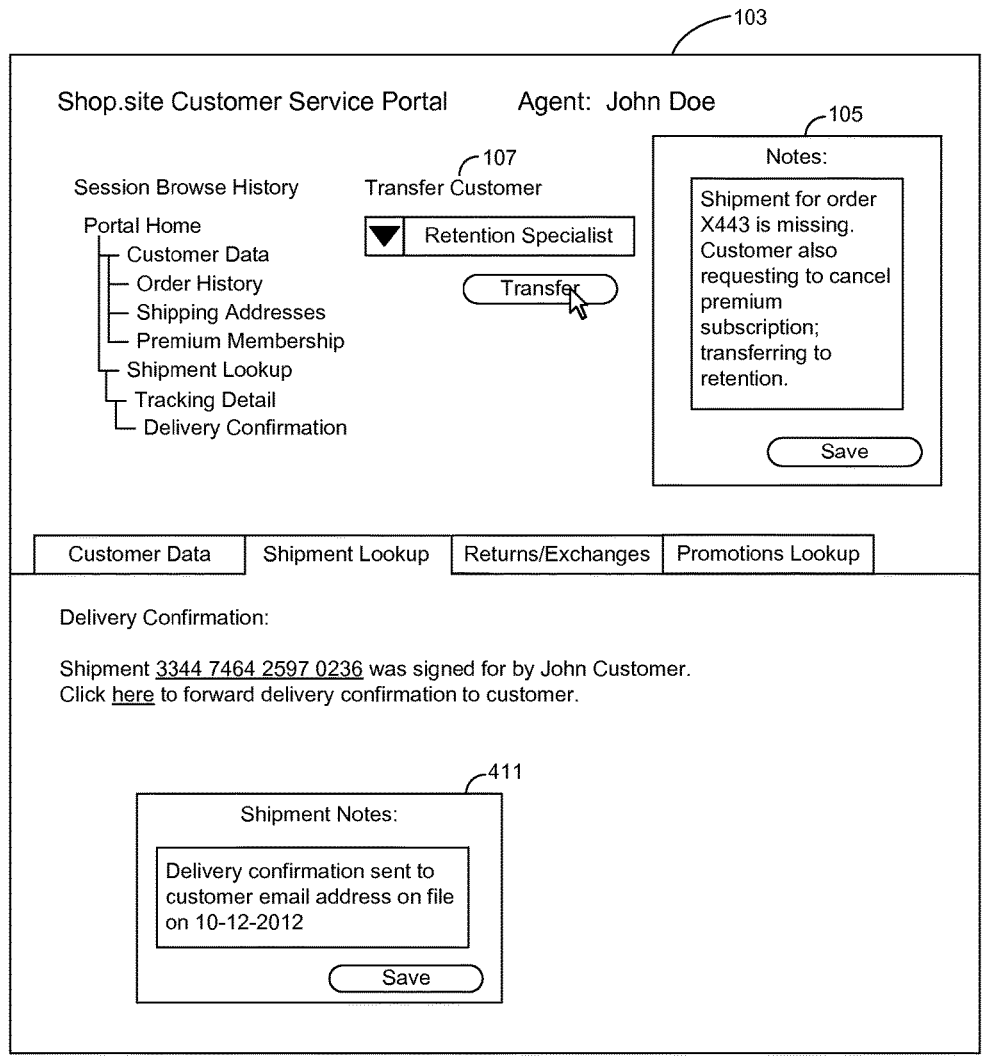

Continuing the example of FIG. 5, reference is now made to FIG. 6, which depicts a user interface 103 that can be generated by the customer service agent application 215 according to various embodiments of the disclosure. In the example user interface 103 of FIG. 6, the customer service agent to whom the support request corresponding to a session in the data store 212 is assigned can also transfer the session and/or the support request of the customer to another customer service agent.

In order to transfer the session, the customer service agent can select a person, group, skill, or other option provided by a transfer user interface element 107. As shown in FIG. 6, the customer service agent can also enter notations via the notation user interface element 105 so that the customer service agent to whom the session is being transferred has access to the session notes 271 to facilitate handling of the support request. In the example shown in FIG. 6, the customer has requested to cancel a premium subscription service, the customer service agent has added comments in the notes 105 related to the customer's request, and the customer service agent, e.g., John Doe, can transfer the session to a retention specialist to handle the customer's further request, as shown in the transfer user interface element 107 of FIG. 6.

Figure 7:
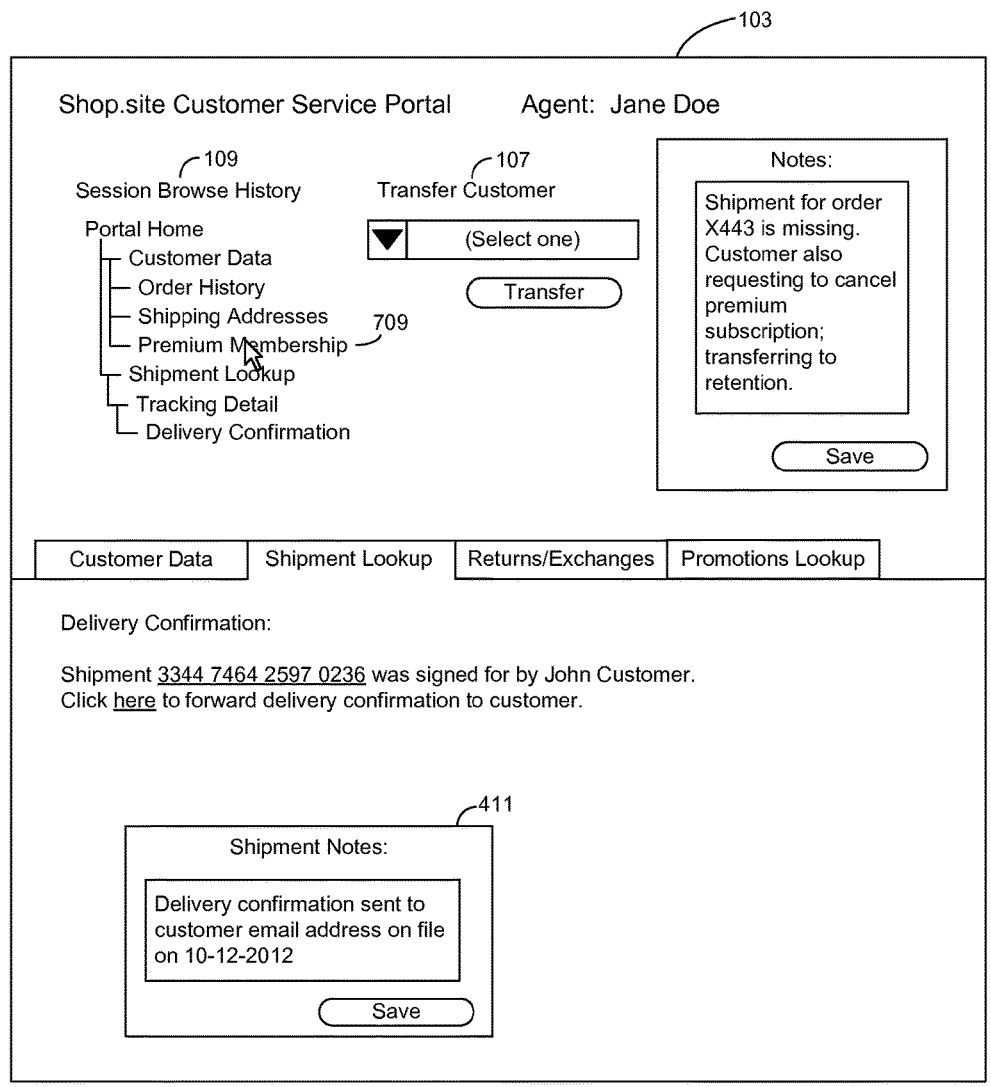

Continuing the example of FIG. 6, reference is now made to FIG. 7, which depicts a user interface 103 that can be generated by the customer service agent application 215 according to various embodiments of the disclosure. In the example user interface 103 of FIG. 7, the customer service agent, e.g., Jane Doe, a retention specialist, to whom the session has been transferred is presented with another user interface 103 generated by the customer service agent application 215 that includes the browse history user interface element 109 generated and/or updated by the previous customer service agent, e.g., John Doe. In this way, the customer service agent to whom the support request has been transferred may view the browse history 273 as well as access the content pages and session notes associated with the browse history 273.

As noted above, the session data 249 corresponding to the session can also include a page cache 275 that caches pages associated with the session. Accordingly, the customer service agent application 215 can also retrieve cached pages from the page cache 275 when the customer service agent to whom the session has been transferred navigates the browse history user interface element 109 by activating a link embedded in the hierarchical tree. For example, as shown in FIG. 7, the customer service agent can follow a link associated with node 709 to access a cached content page associated with the node.

Figure 8:
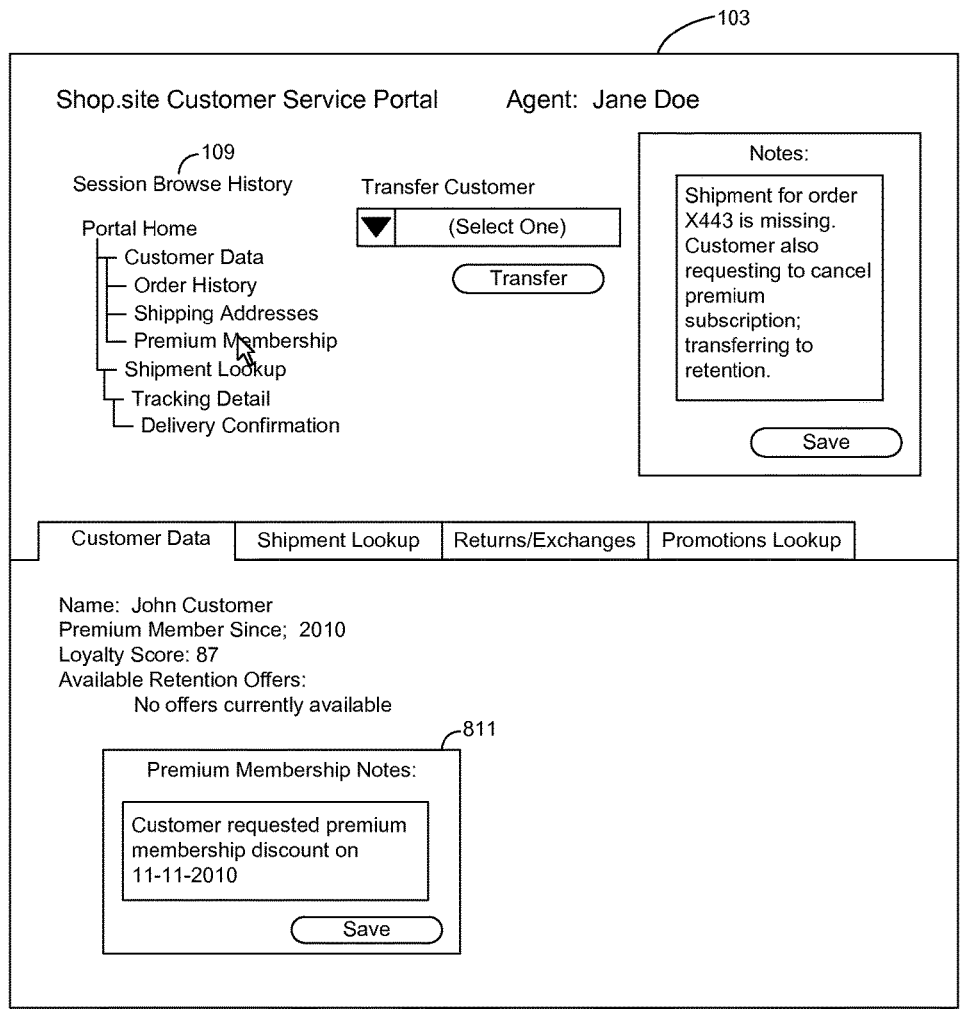

Continuing the example of FIG. 7, reference is now made to FIG. 8, which depicts a user interface 103 that can be generated by the customer service agent application 215 according to various embodiments of the disclosure. In the example user interface 103 of FIG. 8, the customer service agent to whom the session has been transferred has followed a link, e.g., Premium Membership information, embedded in the browse history user interface element 109 as shown in FIG. 8. Accordingly, FIG. 8 illustrates a resulting user interface 103 generated by the customer service agent application 215, which can be retrieved from the page cache 275 stored in the data store 212. FIG. 8 also illustrates a contextual notation user interface element 811 that is associated with the user interface 103 generated by the customer service agent application 215. In the example shown in FIG. 8, the customer has requested a premium membership discount, and the customer service agent has added comments in the contextual notation user interface element 811 related to the customer's request.

Figure 9:
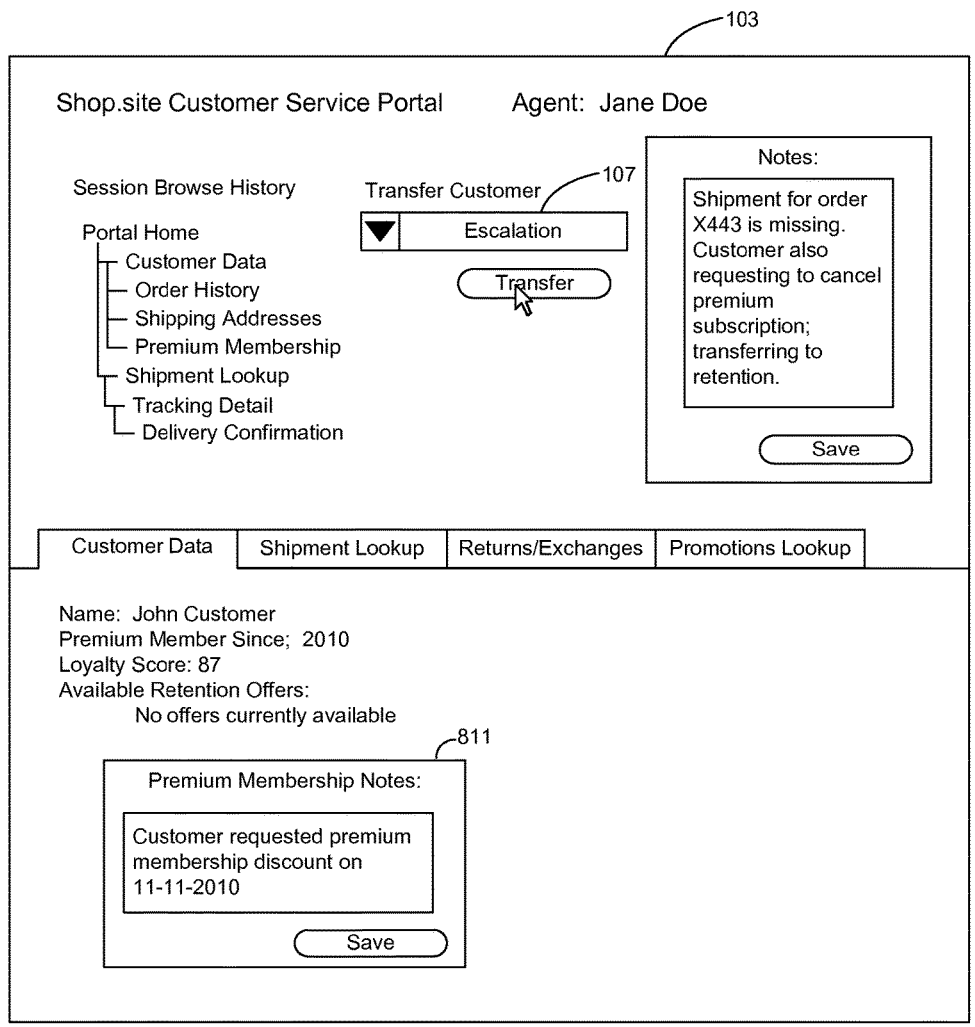

Continuing the example of FIG. 8, reference is now made to FIG. 9, which depicts a user interface 103 that can be generated by the customer service agent application 215 according to various embodiments of the disclosure. FIG. 9 illustrates that a particular session can potentially be transferred multiple times to one or more additional customer service agents in order to service a support request initiated by a customer. In the example of FIG. 9, the customer service agent to whom the session is assigned can initiate yet another transfer of the session to another customer service agent by selecting an agent, group of agents and/or department to which the session should be transferred by manipulating the transfer user interface element 107. In the example shown in FIG. 9, the customer service agent, e.g., Jane Doe, can transfer the session to an escalation agent to handle the customer's further request, as shown in the transfer user interface element 107 of FIG. 9.

Figure 10:
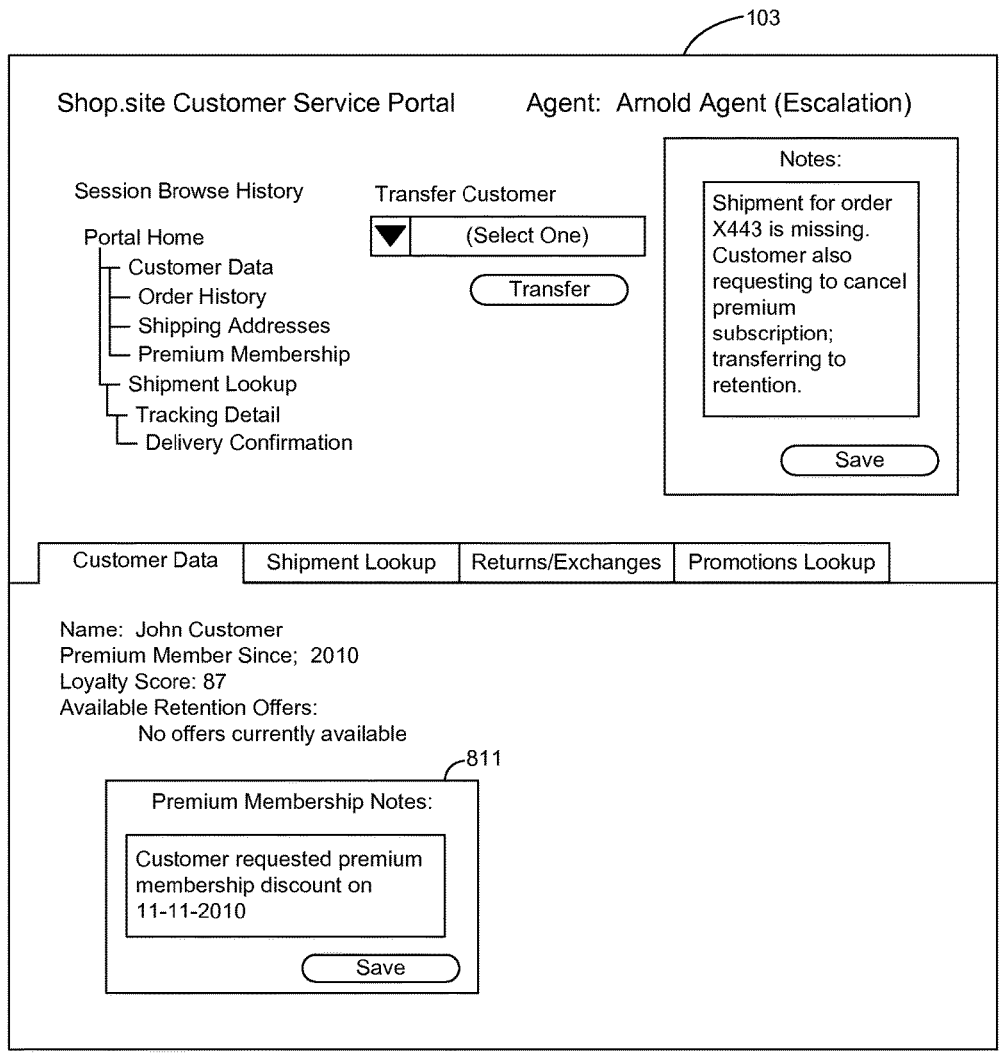

Continuing the example of FIG. 9, reference is now made to FIG. 10, which depicts a user interface 103 that can be generated by the customer service agent application 215 according to various embodiments of the disclosure. In the example user interface 103 of FIG. 10, the customer service agent, e.g., Arnold Agent (Escalation), to whom the session has been transferred is presented with another user interface 103 generated by the customer service agent application 215 that includes the browse history user interface element 109 generated and/or updated by the previous customer service agents, e.g., John Doe and Jane Doe. In this way, the customer service agent to whom the support request has been transferred may view the browse history 273 of any of the previous customer service agents associated with the support request as well as access the content pages and session notes associated with the browse history 273. Additionally, FIG. 10 illustrates how a session associated with a support request can be potentially transferred multiple times to multiple agents, and the customer service agent application 215 can generate a user interface 103 that retains contextual information, such as a browse history and notations, that are generated as a result of previous customer service agents' handling of the support request.

Figure 11:
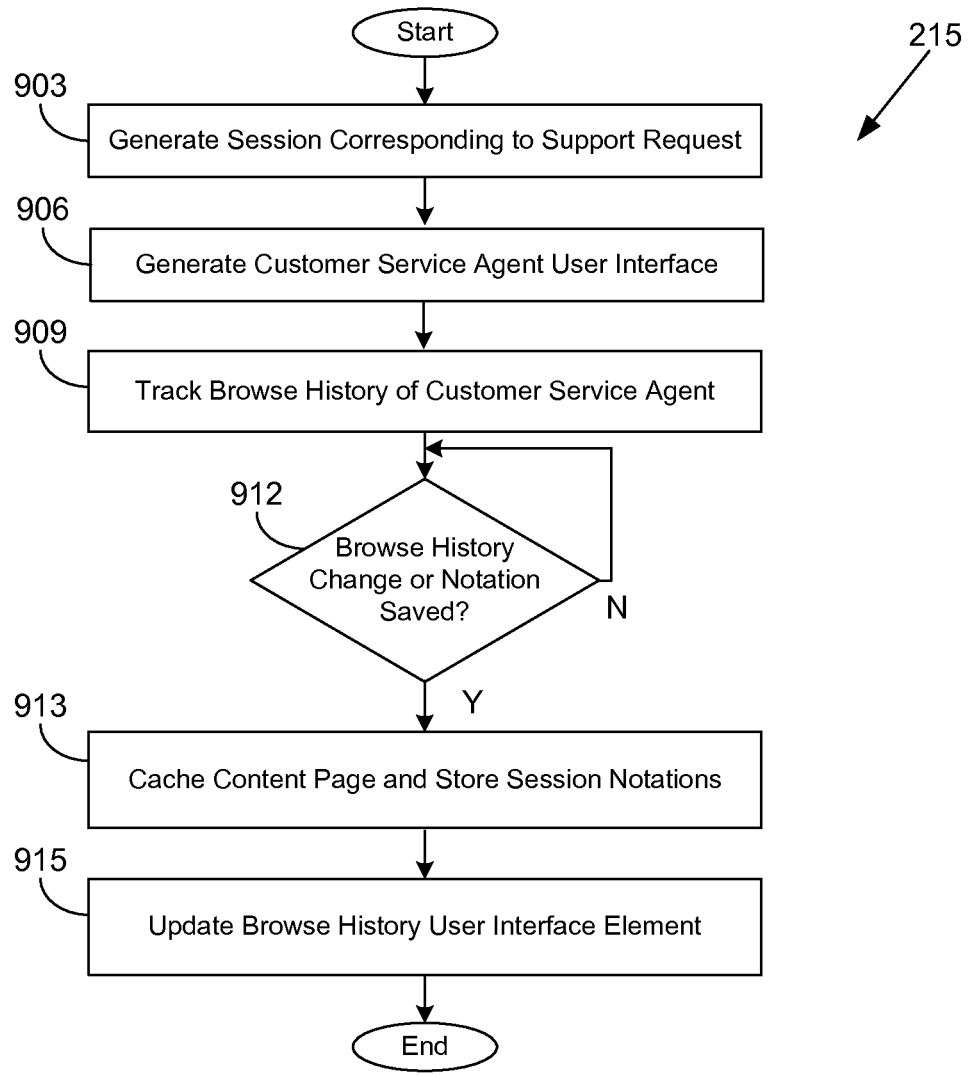
FIGS. 11-13 show flowcharts illustrating one example of functionality implemented as portions of a product queue application executed in a computing environment in the networked environment of FIG. 2 according to various embodiments of the present disclosure.

Referring next to FIG. 11, shown is a flowchart that provides one example of the operation of a portion of the customer service agent application 215 according to various embodiments. It is understood that the flowchart of FIG. 11 provides merely an example of the many different types of functional arrangements that may be employed to implement the operation of the portion of the customer service agent application 215 as described herein. As an alternative, the flowchart of FIG. 11 may be viewed as depicting an example method implemented in the computing environment 203 (FIG. 2) according to one or more embodiments.

FIG. 11 illustrates an example of how the customer service agent application 215 can generate a session corresponding to a support request initiated by a customer and generate a browse history user interface element 109. First, in box 903, the customer service agent application 215 can generate a session corresponding to a support request initiated by a customer. The session can be assigned by the customer service agent application 215 to an appropriate customer service agent. At box 906, the customer service agent application 215 can generate a customer service agent user interface that includes a browse history user interface element 109 that can be rendered on a client 106 associated with the customer service agent.

At box 909, the customer service agent application 215 can track browse history 273 of the customer service agent, which can be stored in the session data 249 corresponding to the session in the data store 212. At box 912, the customer service agent application 215 can detect a change in the browse history 273 or whether one or more notations are saved by the customer service agent via a notation user interface element in the user interface 103. If a change is detected and/or notations are obtained via the user interface 103, then the customer service agent application 215 can cache the content page associated with the change in the browse history 273 in the page cache 275 in the data store 212 or store notations saved by the customer service agent as session notes 271 in the data store 212 at box 913. Then, at box 915, the customer service agent application 215 can update the browse history user interface element 109 rendered in the customer service agent user interface. Various steps, e.g., boxes 909, 912, 913, 915, of the flowchart of FIG. 11 may be repeated as further updates and/or changes are made to the user interface 103.

Figure 12:
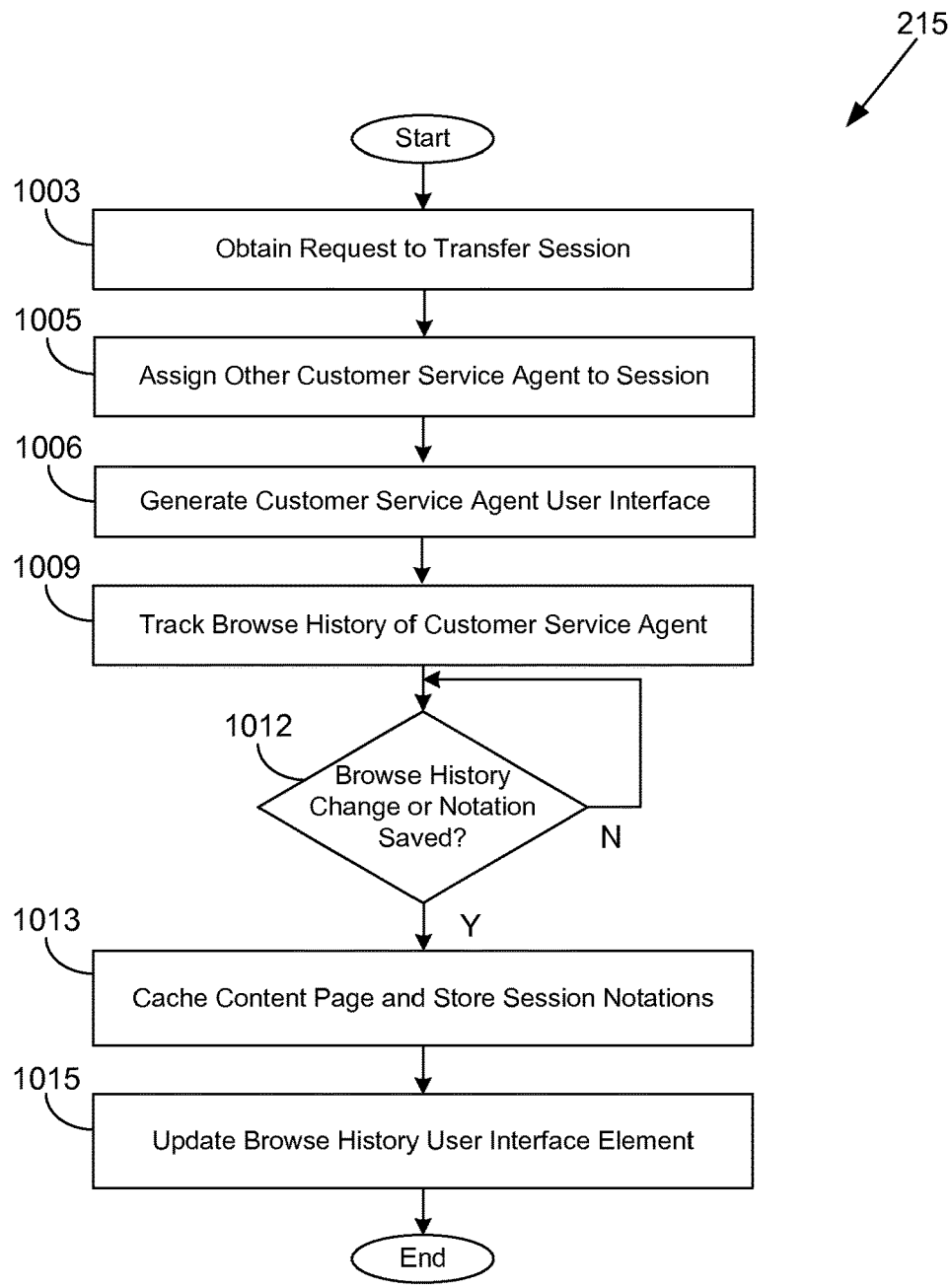

Referring next to FIG. 12, shown is a flowchart that provides one example of the operation of a portion of the customer service agent application 215 according to various embodiments. It is understood that the flowchart of FIG. 12 provides merely an example of the many different types of functional arrangements that may be employed to implement the operation of the portion of the customer service agent application 215 as described herein. As an alternative, the flowchart of FIG. 12 may be viewed as depicting an example method implemented in the computing environment 203 (FIG. 2) according to one or more embodiments.

FIG. 12 illustrates an example of how the customer service agent application 215 can transfer a session corresponding to a support request initiated by a customer to another customer service agent. First, in box 1003, the customer service agent application 215 can obtain a request to transfer a session corresponding to a support request initiated by a customer. At box 1005, the session can be assigned by the customer service agent application 215 to an appropriate customer service agent depending upon the person and/or group to which the customer service agent requests to transfer the session. At box 1006, the customer service agent application 215 can generate a customer service agent user interface that includes a browse history user interface element 109 that can be rendered on a client 106 associated with the customer service agent to whom the session is being transferred.

At box 1009, the customer service agent application 215 can track browse history 273 of the customer service agent to whom the session has been transferred, which can be stored in the session data 249 corresponding to the session in the data store 212. At box 1012, the customer service agent application 215 can detect a change in the browse history 273 or whether one or more notations are saved by the customer service agent via a notation user interface element in the user interface 103. If a change is detected and/or notations are obtained via the user interface 103 then the customer service agent application 215 can cache the content page associated with the change in the browse history 273 in the page cache 275 in the data store 212 or store notations saved by the customer service agent as session notes 271 in the data store 212 at box 1013. Then, at box 1015, the customer service agent application 215 can update the browse history user interface element 109 rendered in the customer service agent user interface. Various steps, e.g., boxes 1009, 1012, 1013, 1015, of the flowchart of FIG. 12 may be repeated as further updates and/or changes are made to the user interface 103 by the customer service agent to whom the session has been transferred.

It should be appreciated that, in some scenarios, a session may be transferred more than once to another customer service agent. In other words, a session may be transferred from a first customer service agent to a second customer service agent, who may in turn transfer the session to a third customer service agent, and so on. Multiple session transfers may take place in order to route a support request to an appropriate customer service agent depending upon the needs of a customer and/or particular expertise associated with a given support request.

Figure 13:
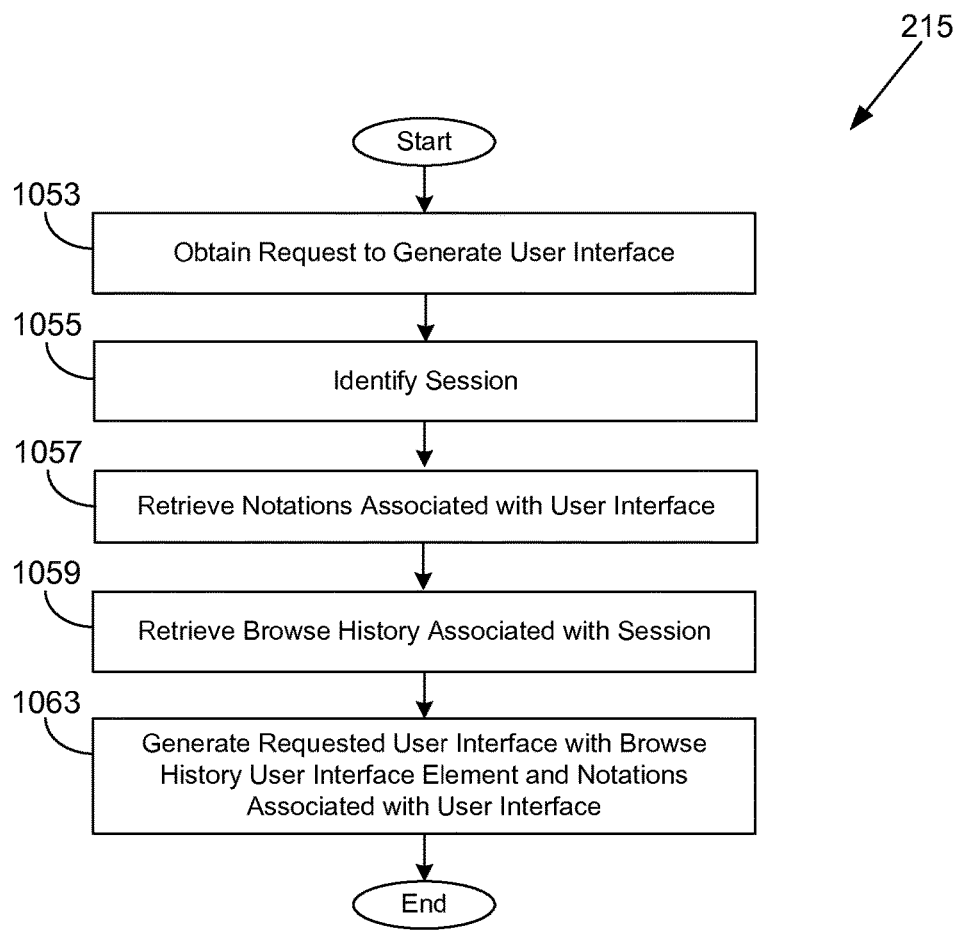

Referring next to FIG. 13, shown is a flowchart that provides one example of the operation of a portion of the customer service agent application 215 according to various embodiments. It is understood that the flowchart of FIG. 13 provides merely an example of the many different types of functional arrangements that may be employed to implement the operation of the portion of the customer service agent application 215 as described herein. As an alternative, the flowchart of FIG. 13 may be viewed as depicting an example method implemented in the computing environment 203 (FIG. 2) according to one or more embodiments.

FIG. 13 illustrates an example of how the customer service agent application 215 can generate a user interface 103 that can be rendered by a customer service agent client 206 according to various embodiments of the disclosure. First, at box 1053, the customer service agent application 215 can obtain a request to generate a user interface 103 associated with a support request. Such a request can be obtained from a client application 281 executed by a customer service agent client 206. Next, at box 1055, the customer service agent application 215 can identify a session associated with the support request.

At box 1057, the customer service agent application 215 can retrieve session notes 271, or notations, that are associated with the session and the particular requested user interface 103 from the data store 212. For example, if the user interface 103 corresponds to a particular content page for which contextual notations are saved in the data store 212, the customer service agent application 215 can retrieve the contextual notations that are associated with the requested user interface 103 from the data store 212.

At box 1059, the customer service agent application 215 can retrieve the browse history 273 associated with the session including any associated page caches 275. At box 1063, the customer service agent application 215 can generate the requested user interface with a browse history user interface element as well as notations associated with the particular user interface that are retrieved from the data store 212. As noted above, the browse history user interface element can express a browse history associated with a particular session associated with a support request.

Figure 14:
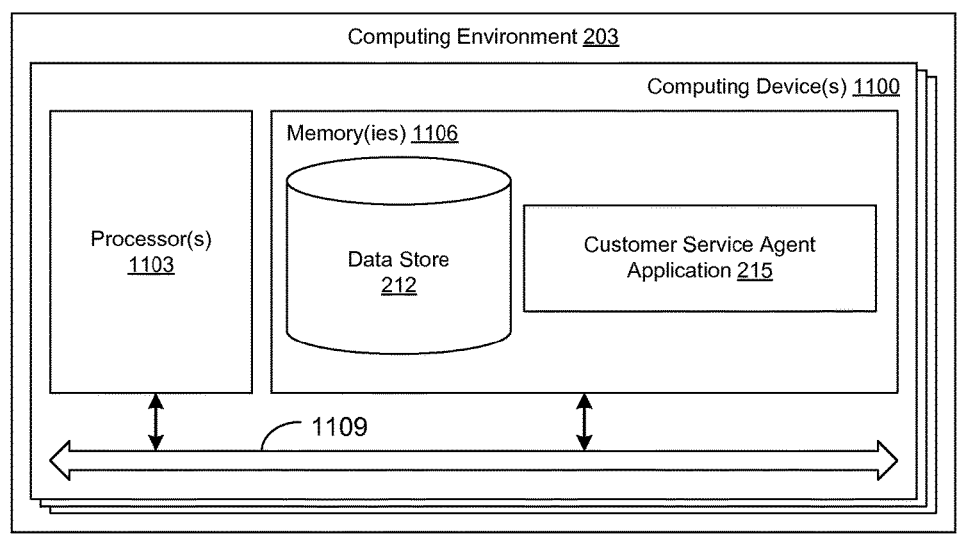
FIG. 14 is a schematic block diagram that provides one example illustration of a computing environment employed in the networked environment of FIG. 2 according to various embodiments of the present disclosure.

With reference to FIG. 14, shown is a schematic block diagram of the computing environment 203 according to an embodiment of the present disclosure. The computing environment 203 includes one or more computing devices 1100. Each computing device 1100 includes at least one processor circuit, for example, having a processor 1103 and a memory 1106, both of which are coupled to a local interface 1109. To this end, each computing device 1100 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are a customer service agent application 215 and potentially other applications. Also stored in the memory 1106 may be a data store 212 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and/or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the customer service agent application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 11-13 show the functionality and operation of an implementation of portions of the customer service agent application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 11-13 show a specific order of execution, it is understood that the order of execution may differ from that which is depicted. For example, the order of execution of two or more blocks may be scrambled relative to the order shown. Also, two or more blocks shown in succession in FIGS. 11-13 may be executed concurrently or with partial concurrence. Further, in some embodiments, one or more of the blocks shown in FIGS. 11-13 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the customer service agent application 215, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the customer service agent application 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1100, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, configured to cause the at least one computing device to at least:
generate a session in a data store associated with a support request from a customer for support, the session being associated with a session identifier that uniquely identifies the session with respect to a plurality of sessions stored in the data store;
determine a first customer service agent to whom to assign the session based at least in part on an input provided during a phone call, the first customer service agent using a first client device, the first customer service agent associated with a user identifier uniquely identifying the first customer service agent with respect to other customer service agents;
generate a hierarchical tree user interface element in a customer service agent user interface associated with the session for the first client device, the hierarchical tree user interface element including a hierarchical tree expressing a browse history associated with the first customer service agent during the session, wherein a respective child node of the hierarchical tree corresponds to a respective hyperlink followed from a respective parent node of the respective child node, wherein the browse history indicates at least one respective content page of a customer portal to which a second customer service agent has navigated during a previous session;
track activity of the first customer service agent during the session, the activity of the first customer service agent being stored in the data store with the browse history of the hierarchical tree, the activity comprising an identification of a plurality of content pages visited by the first customer service agent, the plurality of content pages being stored in a page cache in the data store;
update the hierarchical tree user interface element by adding a respective node to the hierarchical tree based at least in part upon the activity stored with the browse history, the respective node comprising a hyperlink to at least one of the plurality of content pages visited by the first customer service agent;
receive a request to transfer the session to a third client device associated with a third customer service agent;
transfer the browse history for the session stored in the data store to the third customer service agent; and
render the hierarchical tree user interface element in the third client device, wherein rendering the hierarchical tree user interface element comprises rendering the hierarchical tree to include the hyperlink and establishing the hyperlink to correspond with a cached content page associated with the browse history, wherein the cached content page is determined based at least in part on a retrieval of the page cache for the browse history.

2. The non-transitory computer-readable medium of claim 1, the program further configured to cause the at least one computing device to:
render another customer service agent user interface on behalf of the third customer service agent, the other customer service agent user interface comprising the hierarchical tree user interface element including the browse history associated with the first customer service agent.

3. The non-transitory computer-readable medium of claim 2, the program further configured to cause the at least one computing device to track activity of the third customer service agent during the session, the activity of the third customer service agent being stored in the data store with the browse history of the hierarchical tree associated with the session.

4. The non-transitory computer-readable medium of claim 1, wherein the customer service agent user interface further comprises a notation user interface element, the notation user interface element being specific to a particular content page associated with the customer service agent user interface, and the program is further configured to cause the at least one computing device to receive at least one notation from the notation user interface element and save the at least one notation in the data store associated with the session.

5. A system, comprising:
at least one computing device configured to execute a customer service agent application, the customer service agent application configured to cause the at least one computing device to at least:
generate a session in a data store associated with a support request from a customer, the session being assigned to a first customer service agent;
generate a customer service agent user interface associated with the session, the customer service agent user interface having a browse history user interface element comprising a hierarchical tree expressing a browse history of the first customer service agent associated with the support request, the browse history being associated with the session in the data store and indicating one or more pages of a customer portal to which a second customer service agent has navigated during a previous session;
track the browse history of the first customer service agent in association with the support request and the session, the browse history comprising an identification of a respective content page visited by the first customer service agent;
update the browse history user interface element by adding a respective node to the hierarchical tree in response to a change in the browse history, the respective node comprising a hyperlink to the respective content page visited by the first customer service agent;
transfer the browse history for the session stored in the data store to the second customer service agent or a third customer service agent in response to receiving a request to transfer the session; and
generate another customer service agent user interface on behalf of the second customer service agent or the third customer service agent, wherein the other customer service agent user interface comprises the browse history user interface element and the hierarchical tree expressing the browse history of the first customer service agent, wherein the hierarchical tree expresses the browse history by including the hyperlink and establishing the hyperlink to correspond with a cached content page associated with the browse history.

6. The system of claim 5, wherein the customer service agent application is further configured to cause the at least one computing device to:
track a browse history of the third customer service agent in association with the support request and the session; and
update the browse history user interface element in response to a change in the browse history of the third customer service agent.

7. The system of claim 5, wherein a plurality of respective nodes of the hierarchical tree correspond to individual ones of a plurality of respective cached content pages associated with the browse history.

8. The system of claim 5, wherein a respective child node of the hierarchical tree corresponds to a respective link followed from a respective parent node of the respective child node.

9. The system of claim 5, wherein the customer service agent user interface further comprises a notation user interface element with which the session can be notated.

10. The system of claim 5, wherein the customer service agent application is further configured to cause the at least one computing device to cache a plurality of respective content pages associated with the browse history of the third customer service agent in the data store associated with the session.

11. The system of claim 10, wherein the customer service agent application is further configured to cause the at least one computing device to load a selected one of the plurality of respective content pages stored in the cache in response to a request to access the selected one of the plurality of respective content pages.

12. The system of claim 11, wherein the request to access the selected one of the plurality of respective content pages stored in the cache is received via the other customer service agent user interface.

13. The system of claim 10, wherein the customer service agent user interface further comprises respective contextual notation user interface elements associated with respective content pages with which the session can be notated.

14. The system of claim 5, wherein a first node of the hierarchical tree corresponds to a first content page in the browse history and a second node of the hierarchical tree corresponds to a second content page accessed later in time than the first content page, wherein the second node of the hierarchical tree is displayed below the first node of the hierarchical tree.

15. A method, comprising:
generating, via at least one of one or more computing devices, a session corresponding to a support request initiated by a customer, the session stored in a data store and being associated with a first customer service agent;
tracking, via at least one of the one or more computing devices, a browse history of the first customer service agent associated with the session, the browse history comprising an identification of a respective content page visited by the first customer service agent;
rendering, via at least one of the one or more computing devices, a first customer service agent user interface associated with the session, the first customer service agent user interface comprising a browse history user interface element that comprises a hierarchical tree generated based at least in part upon the browse history, the browse history indicating at least one page of a customer portal to which a second customer service agent has previously navigated;
updating, via at least one of the one or more computing devices, the browse history user interface element by adding a respective node to the hierarchical tree in response to a change in the browse history, the respective node comprising a hyperlink to the respective content page visited by the first customer service agent;
receiving, via at least one of the one or more computing devices, a request to transfer the session to a third customer service agent;

transferring, via at least one of the one or more computing devices, the browse history for the session stored in the data store to a third client device associated with the third customer service agent in response to receiving the request to transfer the session; and rendering, via at least one of the one or more computing devices, the hierarchical tree in the third client device, wherein rendering the hierarchical tree comprises including the hyperlink and establishing the hyperlink to correspond with a cached content page associated with the browse history.

16. The method of claim 15, further comprising:

rendering, via at least one of the one or more computing devices, a second customer service agent user interface associated with the second customer service agent, the second customer service agent user interface comprising the browse history user interface element;

tracking, via at least one of the one or more computing devices, a browse history of the second customer service agent associated with the session; and updating, via at least one of the one or more computing devices, the browse history user interface element in response to a change in the browse history of the second customer service agent.

17. The method of claim 15, wherein the session was transferred to the second customer service agent, and further comprising:

receiving, via at least one of the one or more computing devices, another request to transfer the session from the second customer service agent to the third customer service agent; and transferring, via at least one of the one or more computing devices, the session to the third customer service agent in response to receiving the other request to transfer the session.

18. The method of claim 17, further comprising:

tracking, via at least one of the one or more computing devices, a browse history of the third customer service agent associated with the session; and updating, via at least one of the one or more computing devices, the browse history user interface element in response to a change in the browse history of the third customer service agent.

19. The method of claim 15, wherein transferring the session to the second customer service agent or the third customer service agent further comprises transmitting the page cache for the browse history of the first customer service agent to the second customer service agent or the third customer service agent, the page cache comprising the respective content page visited by the first customer service agent.

20. The system of claim 5, wherein the customer service agent application is further configured to cause the at least one computing device to at least determine to assign the session to the first customer service agent based at least in part on a touchtone input provided during a phone call.

* * * * *